(12) United States Patent
Otterstedt et al.

(10) Patent No.: US 7,660,169 B2
(45) Date of Patent: Feb. 9, 2010

(54) DEVICE AND METHOD FOR NON-VOLATILE STORAGE OF A STATUS VALUE

(75) Inventors: Jan Otterstedt, Unterhaching (DE); Christian Peters, Vaterstetten (DE); Dirk Rabe, Munich (DE); Holger Sedlak, Lochhofen (DE)

(73) Assignee: Infineon Technologies AG (DE)

( * ) Notice: Subject to any disclaimer, the term of this patent is extended or adjusted under 35 U.S.C. 154(b) by 318 days.

(21) Appl. No.: 11/564,695

(22) Filed: Nov. 29, 2006

(65) Prior Publication Data

US 2007/0136529 A1  Jun. 14, 2007

(30) Foreign Application Priority Data

Nov. 29, 2005  (DE) .................. 10 2005 056 940

(51) Int. Cl.
*G11C 7/00* (2006.01)
(52) U.S. Cl. .................. 365/191; 365/226; 365/229; 365/227
(58) Field of Classification Search ................. 365/191, 365/226, 229, 227
See application file for complete search history.

(56) References Cited

U.S. PATENT DOCUMENTS

| | | | | |
|---|---|---|---|---|
| 4,777,626 A | * | 10/1988 | Matsushita et al. | 365/226 |
| 4,962,484 A | * | 10/1990 | Takeshima et al. | 365/185.04 |
| 5,677,874 A | * | 10/1997 | Yamano | 365/185.18 |
| 5,691,947 A | * | 11/1997 | Paun et al. | 365/226 |
| 6,601,003 B2 | * | 7/2003 | Okamoto | 702/64 |
| 6,735,727 B1 | * | 5/2004 | Lee | 714/711 |
| 7,036,018 B2 | * | 4/2006 | Horvat et al. | 713/189 |
| 7,039,815 B1 | | 5/2006 | Grassl et al. | |
| 7,260,002 B2 | * | 8/2007 | Choi et al. | 365/196 |
| 2003/0005315 A1 | | 1/2003 | Horvat et al. | |
| 2005/0235168 A1 | * | 10/2005 | Nonaka et al. | 713/300 |
| 2006/0192681 A1 | | 8/2006 | Haider et al. | |

FOREIGN PATENT DOCUMENTS

| | | |
|---|---|---|
| AT | 408 925 B | 4/2002 |
| DE | 196 10 070 A1 | 9/1997 |
| DE | 199 42 437 A1 | 3/2001 |
| DE | 199 47 574 A1 | 4/2001 |
| DE | 103 27 285 A1 | 1/2005 |
| KR | 10-2004-0091205 | 4/2003 |
| WO | WO-88/10479 A1 | 12/1988 |
| WO | WO-99/56253 A1 | 11/1999 |
| WO | WO-02/19112 A1 | 3/2002 |

* cited by examiner

*Primary Examiner*—Connie C Yoha
(74) *Attorney, Agent, or Firm*—Dickstein, Shapiro, LLP.

(57) ABSTRACT

A device for non-volatile storage of a status value indicating that there has been a condition, including a non-volatile storage, an energy storage for storing energy when applying a supply voltage, and a switching circuit to couple the energy storage to the non-volatile storage to write the status value thereto if the condition is present.

19 Claims, 3 Drawing Sheets

DEVICE AND METHOD FOR NON-VOLATILE STORAGE OF A STATUS VALUE

CROSS REFERENCE TO RELATED APPLICATION

This application claims priority from German Patent Application No. 10 2005 056 940.4, which was filed on Nov. 29, 2005, and is incorporated herein by reference in its entirety.

BACKGROUND OF THE INVENTION

1. Field of the Invention

The present invention relates to a device for non-volatile storage of a status value, in particular in the field of security-relevant systems, such as, for example, chip cards or smart cards.

2. Description of Related Art

Integrated security circuits, as are, for example, used in chip cards or smart cards, in particular in the field of security-relevant applications, like for example in the field of access protection for non-public areas, computer systems or secret information, aim at defeating attacks performed for fraudulent purposes. The goal of such attacks frequently is obtaining information stored in the integrated security circuits of the chip cards in order to obtain special privileges in an unauthorized manner.

BRIEF DESCRIPTION OF THE DRAWINGS

Preferred embodiments of the present invention will be detailed subsequently referring to the appended drawings, in which.

DESCRIPTION OF PREFERRED EMBODIMENTS

Figure 1:
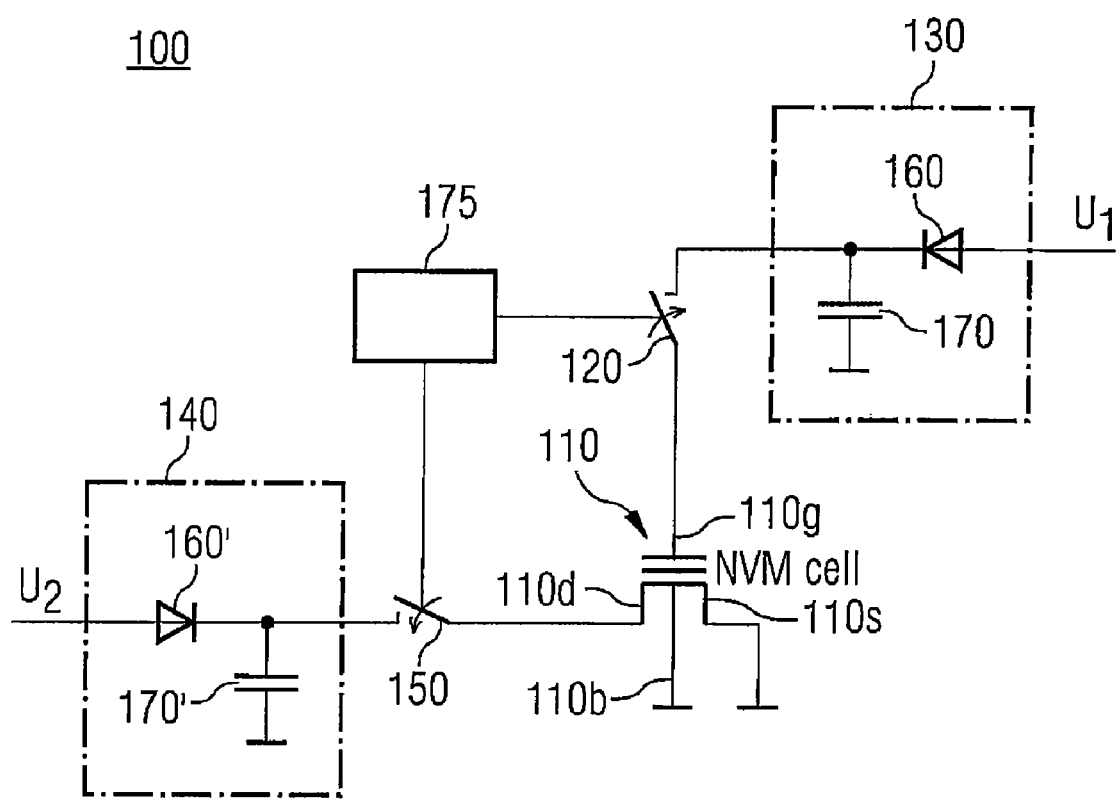
FIG. 1 is a partial circuit diagram of a an of a device for non-volatile storage of a status value.

In accordance with an embodiment, the present invention provides a device for non-volatile storage of a status value indicating that there has been a condition, having non-volatile storage devices, energy storage for storing energy when applying a supply voltage, and switch to couple the energy storage to the non-volatile storage to write the status value thereto if the condition applies.

In accordance with another embodiment, there is a method for non-volatile storage of a status value indicating that there has been a condition, including a step of storing energy in energy storage if a supply voltage is applied, and a step of coupling the energy storage to non-volatile storage for writing the status value to the non-volatile storage if the condition applies.

In accordance with another embodiment, there is a program having a program code for performing the above-mentioned method of non-volatile storage of a status value when the program runs on a processor.

The present invention is based on the finding that increased security against attacks can be achieved if a status value is stored in a non-volatile manner when a condition arises which, in preferred embodiments of the invention, is an interruption in a supply voltage. In preferred embodiments of the invention, this can be achieved by storing a limited amount of energy in an energy storage which will remain available for a certain period of time, for example after an unexpected interruption in the supply voltage, to change the state of a non-volatile memory cell (NVM cell). By holding a limited or unlimited amount of energy or residual energy, volatile information can be stored in a non-volatile manner so that it will be available after a future restart. It is of particular advantage here that information can even be stored in a non-volatile manner if the energy supply is interrupted simultaneously or close in time to the writing process.

In an embodiment of the present invention, the switch for automatically coupling the energy storage to a non-volatile storage is implemented by a switch coupled with a control input to a voltage derived from the supply voltage. Here, in connection with the present application, a voltage derived from the supply voltage an electric voltage which is no longer available either when interrupting the supply voltage. Here, the voltage derived can have greater or smaller a magnitude relative to the supply voltage or a sign opposite to that of the supply voltage.

In another embodiment of the present invention, the switch is coupled with a control input to a generator for generating a control signal which allows preventing coupling the energy storage to the non-volatile storage device, for example in the case of expected switch-off.

An advantage of the device for non-volatile storage of a status value is offering new ways of application. Thus, security validation which is also referred to as security certification is, for example, made easier by the fact that alarm information is stored as a status value. The status value or, in this case, the alarm information may, for example, be used to delay subsequent restart of the system or to block or shut or render unusable processor to which the device for non-volatile storage is coupled after a predetermined number of alarm states, using a counter and a corresponding evaluation of the alarm information.

Thus, as another advantage, the number of potential attack trials in a predetermined period of time which may, for example, be very high in relation to a period required can be limited. As an additional advantage, it is possible by means of the present invention to limit the number of attacks to a certain device.

A variation of an attack to microcontrollers of chip cards frequently performed is enabling the respective chip card very frequently and determining each time whether the microcontroller has accepted access to the chip card as authorized or denied as unauthorized. These attacks additionally frequently go hand in hand with a well-aimed interruption of the supply voltage or energy supply of the chip card. Here, information stored in a volatile manner is lost by switching off the energy supply so that appropriate information processing with a next system start of the processor coupled to the device and, exemplarily, being a central processing unit (CPU), a chip, a crypto-processor, a processor or another integrated circuit, is no longer possible.

Another advantage of the device for non-volatile storage is that it must only be possible to perform a single programming operation or storage process in a "powerless state", that is directly after interrupting the external energy supply, which, on the one hand, keeps the amount of energy buffered and, on the other hand, the complexity as far as circuitry is concerned low. Since the writing process is frequently initiated by a trigger event occurring, such a writing process is also referred to as "powerless event storage". In the normal operating mode, that is when an external supply voltage is available again so that no energy must be stored in this case, the event storage may be read out or erased by a readout operation or erase operation.

There is, for example, no known solution for the problems of the attack variation described above going hand in hand with an interruption of the supply voltage. Thus, the present invention for the first time provides a solution of the disadvantages of existing systems.

An embodiment of a device for non-volatile storage of a status value will be described referring to FIGS. 1 to 4.

FIG. 1 shows a partial circuit diagram of an embodiment of a device 100 for non-volatile storage of a status value. The device 100 has a standard floating gate NVM (non-volatile memory) cell 110, which in FIG. 1 is also referred to as NVM cell and is exemplarily used in EEPROM (electrically erasable read-only memory) memories as non-volatile storage device. For this reason, the NVM cell 110 is also referred to as EEPROM cell. The NVM cell 110 comprises a source terminal 110s and a substrate or bulk terminal 110b connected to a reference potential (such as, for example, ground). A gate terminal 110g which is more explicitly connected to the control gate of the NVM cell 110 is coupled to a first terminal of first switch 120. A second terminal of the first switch 120 is connected to an output of first energy storage device 130. An input of the first energy storage device 130 is coupled to a voltage $U_1$ which in the embodiment shown in FIG. 1 makes available a voltage value of 10 V to the energy storage device 130. The voltage $U_1$ will apply whenever a supply voltage is applied. In the meaning of the invention, the supply voltage is the supply voltage of a processor, such as, for example, of a chip, a CPU or another integrated circuit to which the device is coupled. The device thus may be formed as a part of the electrical or electronical device.

The device 100 for non-volatile storage of a status value comprises, apart from the first energy storage device 130, also second energy storage 140 having an input coupled to a voltage $U_2$ having a value of 4 V. The voltage $U_2$ will apply whenever the supply voltage is applied. The two voltages $U_1$ and $U_2$ derived from the supply voltage may differ here from the supply voltage in relation to both the voltage magnitude and the sign. Thus, such a voltage derived may have a greater or smaller magnitude than the supply voltage and, in relation to its sign, also comprise a reversed sign. Smaller voltage magnitudes may, for example, be generated using a voltage divider, higher voltage magnitudes may, for example, be generated using charge pumps. The two voltages $U_1$ and $U_2$ derived here will not apply if no supply voltage is applied. In this context, it is to be mentioned that the voltage values mentioned here are to be construed only as exemplary and are no limitation with regard to the present invention, which is also true for the exemplary voltage values in the further course of the present invention.

An output of the second energy storage 140 is coupled to a first terminal of second switch 150. The second switch 150 is connected with a second terminal to a drain terminal 110d of the NVM cell. The two energy storage devices 130, 140 each have a diode 160 and 160' coupled to an anode terminal at the input of the two respective energy storage devices 130, 140. The two diodes 160, 160' are each coupled with a cathode terminal to the output of the two energy storage devices 130, 140. In addition, the two energy storage devices 130, 140 each have a capacitor 170, 170' each coupled with a terminal to the output of the energy storage devices 130, 140, and the cathode terminals of the diodes 160, 160' and with a second terminal to the reference potential.

The first and second switches 120, 150 each comprise a control input coupled to controller 175. The controller 175 makes available to both switches 120, 150 a respective control signal so that the two switches 120, 150 are closed responsive to the control signal.

In the normal operating state, the two switches 120, 150 separate the two energy storage devices 130, 140 from the NVM cell 110. In this case, that is when the two voltages $U_1$ and $U_2$ derived from the supply voltage are applied to the inputs of the two energy storage devices 130 and 140, respectively, the two capacities 170, 170' are charged via the two diodes 160, 160' both operated in a forward-biased manner. Charging the two capacitors 170, 170' here takes place using a characteristic time constant which is an RC time constant resulting, on the one hand, from the value of the capacity of the two capacitors 170, 170' and the electrical resistance of the two diodes 160, 160' operated in a forward-biased manner. Since the electrical resistance of a diode operated in a forward-biased manner is generally very small, the two capacitors 170, 170' will very quickly have a charge basically corresponding to the supply voltage applying, considering their respective capacitor values. Due to the short RC time constants of the two energy storage devices 130, 140 resulting, the device 100 can already store the status value in a non-volatile manner responsive to an alarm signal after a very short period of time which is about in the range of a few RC time constants. Thus, the device 100 is ready for usage after this very short period of time.

If there is a condition which may, for example, be an alarm condition in the meaning of a security alarm or any other alarm condition, the switches 120 and 150 will be closed. The condition here may in principle be triggered by a plurality of events, such as, for example, breakdown of the supply voltage, that is when the supply voltage falls below a predetermined value. When the condition arises, the control signal by means of which the switches 120, 150 which may be formed by transistors are closed can be generated by the controller 175. By closing the two switches, the two energy storage devices 130, 140 are connected to the NVM cell 110 such that the NVM cell 110 will be programmed by so-called channel hot electron programming. In order to allow expected switch-off of the processor coupled to the device 100, the controller 175 may be designed such that it will not provide a control signal if it is provided with a signal or a flag indicating such an expected switch-off. A possible example is shutting a program executing the processor. In this case, storage of an alarm condition or status value indicating the condition is not necessary so that the switches 120, 150 do not have to be closed.

The electrical energy of voltage necessary for programming the NVM cell 110 here is buffered or provided by the two capacities 170, 170' of the two energy storage devices 130, 140. Energy storage will also take place if the external supply voltages have already collapsed, that is have fallen below a predetermined voltage value, since the two capacities 170, 170' cannot at all or only very slowly discharge via the components not shown in FIG. 1 connected to the inputs of the two energy storage devices 130, 140, due to the diodes 160, 160' now operated in a reverse-biased manner. The reason for this is the very high electrical resistance of a diode operated in a reverse-biased manner which will also result in a very great RC time constant in relation to a period of time necessary for programming the NVM cell 110.

The limited energy stored in the two energy storage devices 130, 140 will remain available for a predetermined period of time after an unexpected supply voltage breakdown due to the two diodes 160, 160' and may thus be used to change the state of the NVM cell 110. The device 100 for non-volatile storage of a status value thus allows, even after the supply voltage to the electrical system has been interrupted completely or removed, storage of the alarm information directly after this has occurred on a chip including the device 100 for non-volatile storage of a status value. The embodiment of the device 100 shown in FIG. 1 thus represents an exemplary implementation of a powerless even storage which may, for example, be used on chip cards, smart cards and other integrated circuits having an integrated security functionality (security IC). The bit representing the alarm state and stored in the NVM cell 110 may, after the readout process to be described in greater detail below, be exemplarily used as a possible application to delay subsequent restart of the system, or be used together with a control unit and a counter to block or render inoperative the chip after a predetermined number of alarm states.

Figure 2:
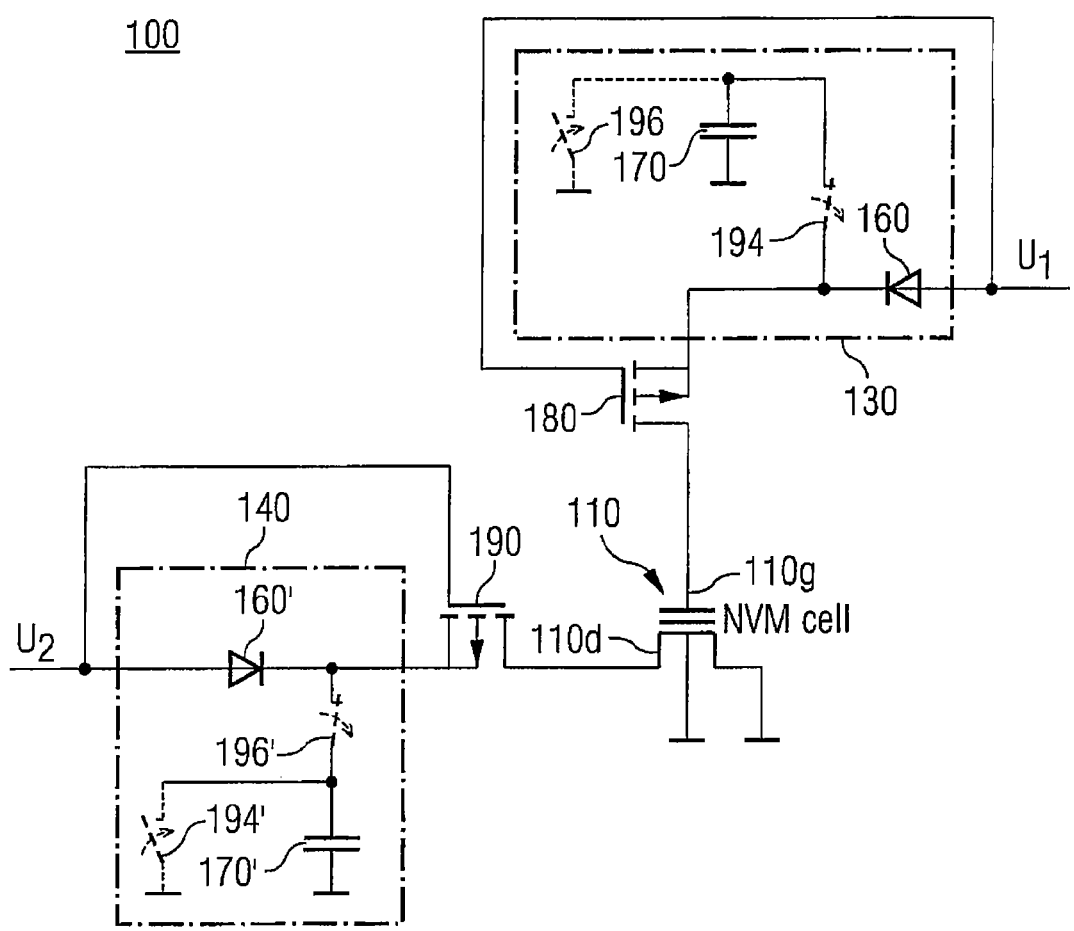
FIG. 2 is a partial circuit diagram of another embodiment of a device for non-volatile storage of a status value.

FIG. 2 shows a partial circuit diagram of another embodiment of a device 100 for non-volatile storage of a status value. The embodiment shown in FIG. 2 differs from the embodiment of a device 100 shown in FIG. 1 only in that the two switches 120, 150 shown in FIG. 1 have been replaced by two enhancement-type PMOS transistors 180, 190. The embodiment shown in FIG. 2 thus shows an embodiment where the switches have been realized as transistors. Connecting the two transistors here takes place such that a respective source terminal and substrate terminal or bulk terminal of the two enhancement-type PMOS transistors 180, 190 are connected to the output of one of the two energy storage devices 130, 140. The enhancement-type PMOS transistor 180 is connected to a drain terminal at the gate terminal 110g of the NVM cell 110, which in FIG. 2 again is referred to as NVM cell. The enhancement-type PMOS transistor 190 is connected with a drain terminal to the drain terminal 110d of the NVM cell 110.

The two enhancement-type PMOS transistors 180, 190 are in addition each connected with a gate terminal to the input of the two energy storage devices 130, 140 so that the gate terminal of the PMOS transistor 180 in the normal operating mode may be supplied with a voltage $U_1$ of, for example, 10 V derived from the supply voltage and the gate terminal of the PMOS transistor 190 with a voltage $U_2$ of, for example, 4 V derived from the supply voltage. The controller 175 of FIG. 1 thus is, in the embodiment shown in FIG. 2, implemented as a respective connection of the two gate terminals of the two enhancement-type PMOS transistors 180, 190 to the two voltages $U_1$ and $U_2$ derived. In the embodiment shown in FIG. 2, the two voltages $U_1$ and $U_2$ derived will each be applied exactly when the supply voltage is also applied.

The mode of functioning of the device 100 for non-volatile storage of a status value shown in FIG. 2 differs only slightly from the mode of functioning of the embodiment shown in FIG. 1. In the embodiment shown here, too, the two electrical capacities 170, 170' will comprise charges basically corresponding to the two voltages $U_1$ and $U_2$ derived from the supply voltage, considering the two capacitor values of the two capacitors 170, 170' shortly after applying the two voltages $U_1$ and $U_2$ derived from the supply voltage due to the small electrical resistance of the forward-biased diodes 160, 160'. In the normal operating mode, due to the connection of the two gate electrodes to the respective supply voltage, the two enhancement-type PMOS transistors 180, 190 thus will block such that there are no voltage values resulting in a change in the state of the NVM cell 110 at the gate terminal 110g and the drain terminal 110d of the NVM cell 110. In this embodiment, the condition or alarm condition will be met if the supply voltage collapses or drops below a predetermined value.

In this case, after the two capacities 170, 170' have been charged, the two enhancement-type PMOS transistors 180, 190 will be connected to be conducting due to the decreased potential applied to the gate terminal so that, assuming a suitable design of the two PMOS transistors 180, 190 and the two capacities 170, 170', voltages resulting in a change in the state of the NVM cell 110 are applied to the NVM cell 110.

Upon the external supply voltage collapsing, the embodiment of the device 100 for non-volatile storage of a status value shown in FIG. 2 will store an alarm signal or status signal which would otherwise be lost and could not be considered due to its volatile nature.

In order to switch off the supply voltage as expected, the energy storage devices 130, 140 shown in FIG. 2 each comprise, as optional components indicated in broken lines in FIG. 2, a normally closed switch 194, 194' each connected between the cathode terminals of the diodes 160, 160' and the capacities 170, 170'. As further optional components, the two energy storage devices 130, 140 each comprise a normally open switch 196, 196' which are connected in parallel to the capacities 170, 170' and connected to the reference potential, that is ground. By the switches 194, 194' connected in series to the capacities 170, 170', the capacities can be separated from the remainder of the circuit in a determined manner before unexpected switch-off of the supply voltage, as is indicated by the arrows in FIG. 2. The two capacities can in this case be discharged subsequently via the two normally open switches 196, 196' so that no energy resulting in a change in the state of the NVM cell 110 is stored in the two energy storage devices 130, 140.

Apart from the embodiments of the two energy storage devices 130, 140 shown in FIGS. 1 and 2 including the two capacities 170, 170' as an energy-storing components, the two energy-storing devices 130, 140 may also comprise inductivities, such as, for example, coils or individual turns of coils, as energy-storing components.

Basically, it is possible in the embodiments of a device 100 for non-volatile storage of a status value shown in FIGS. 1 and 2 to use only one modified energy storage device instead of two energy storage devices 130, 140. Apart from a corresponding design of the capacitor or plurality of capacitors providing the energy or storage, it may be necessary to use a voltage divider to make available more than one voltage value to the NVM cell 110 serving as non-volatile storage device. In addition, in contrast to the embodiment shown in FIGS. 1 and 2, second switch might also be dispensed with.

Apart from the possibility of a non-volatile storage of a status signal shown in the two embodiments in FIGS. 1 and 2 which may, for example, indicate an attack, via channel hot electron programming of an EEPROM cell as an NVM cell, programming of the EEPROM cell using a channel hot hole or the Fowler-Nordheim tunneling effect may also be used with a corresponding wiring. Furthermore, the non-volatile storage device may, for example, also use a fast non-volatile storage where direct writing may take place with low energy consumption.

Figure 3:
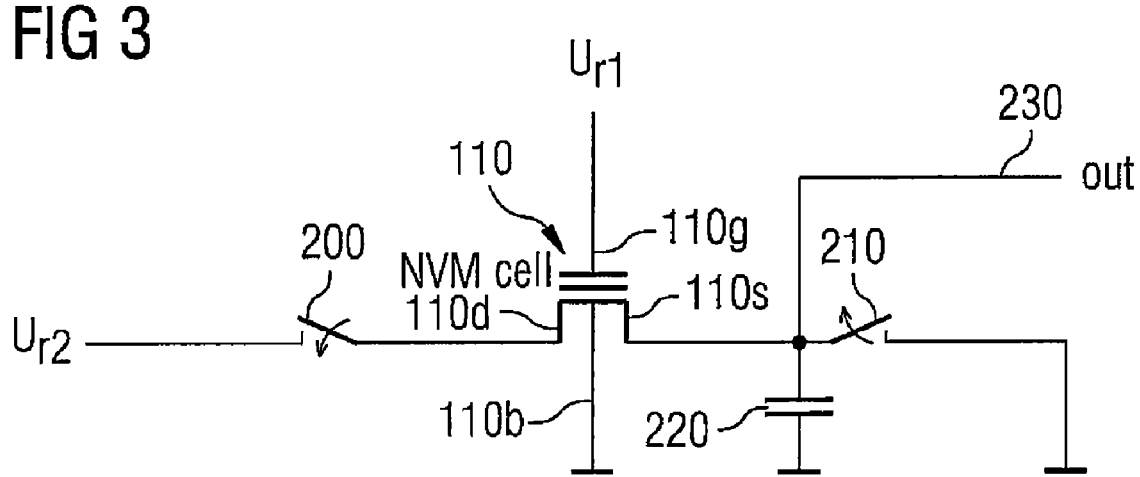
FIG. 3 is a schematic partial circuit diagram of an embodiment of a circuit for reading out a device for non-volatile storage of a status value.
Figure 4:
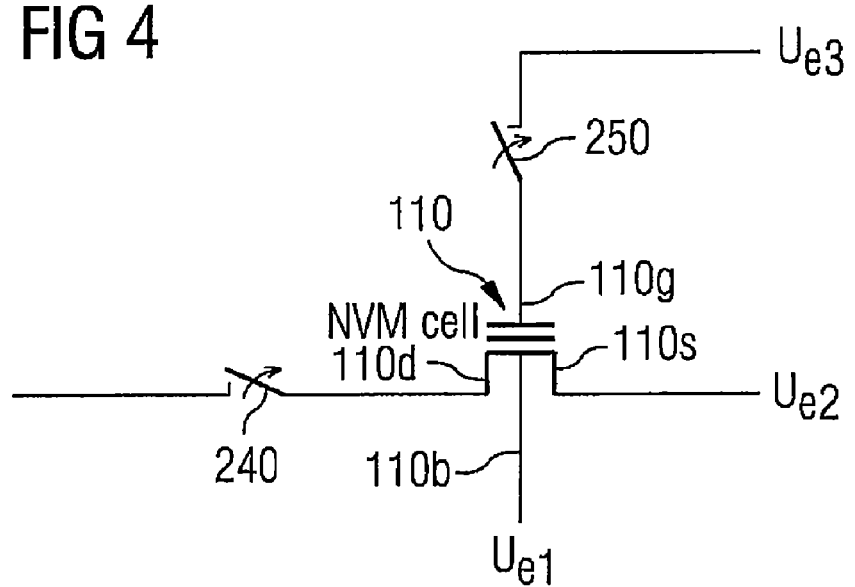
FIG. 4 is a schematic partial circuit diagram of an embodiment of a circuit for erasing a device for non-volatile storage of a status value.

Apart from the actual storage of a status value or alarm information within a powerless event storage process, the system including the device 100 for non-volatile storage of a status value must be able to readout and, if applicable, erase, that is set back to the original state, the non-volatile storage device, that is the NVM cell 110, such as, for example, after a restart. For this purpose, the system generally comprises further circuit components which allow a readout operation on the one hand and an erase operation of the NVM cell 110 on the other hand. FIGS. 3 and 4 each schematically show an embodiment in the form of a partial circuit diagram of the circuits useable for reading out and erasing, respectively, the NVM cell 110. The setup and mode of functioning of the two embodiments illustrated in FIGS. 3 and 4 will be discussed subsequently.

FIG. 3 shows a schematic partial circuit diagram of an embodiment of a readout circuit for reading out the NVM cell 110 already shown in FIGS. 1 and 2, which will again also be referred to as NVM cell. The drain terminal 110d of the NVM cell 110 is connected to a first readout voltage $U_{r1}$ exemplarily comprising a voltage of 1.5 V via a first readout switch 200. The gate terminal 110g of the NVM cell 110 is connected to a second readout voltage $U_{r2}$ exemplarily also having a potential of 1.5 V. The substrate terminal or bulk terminal 110b of the NVM cell 110 in turn is connected to the reference potential. The source terminal 110s of the NVM cell 110 is connected to the reference potential via a second readout switch 210. In addition, the source terminal 110s is also connected to a readout capacitor 220 and a readout terminal 230, which in FIG. 3 is also referred to as "out". Apart from the connection to the source terminal 110s, the readout capacitor 220 is connected to the reference potential.

In order to read out the NVM cell 110, as is indicated in FIG. 3 by arrows, the first readout switch 200 is closed and the second readout switch 210 is opened. By opening the second readout switch 210, the connection of both terminals of the readout capacitor 220 to the reference potential is interrupted so that, if necessary, that is when the section between the source terminal 110s and the drain terminal 110d is connected to be conducting by applying the readout voltage to the gate terminal 110g and the drain terminal 110d of the NVM cell 110, the readout capacitor 220 can be charged due to the current flowing through the NVM cell 110. After a time which is, on the one hand, determined by the capacitor value of the readout capacitor 220 and, on the other hand, basically determined by the electrical resistance of the NVM cell 110, the readout voltage is basically applied to the readout terminal 230 in case the NVM cell 110 is connected to be conducting. If, however, the NVM cell 110 is not in a switched-through state by applying the readout voltages to the gate terminal 110g and the drain terminal 110d, that is if the NVM cell 110 is blocking, the potential applied to the readout terminal 230 will basically be identical to the reference potential. Deviations may basically arise by leakage currents, for example through the NVM cell 110. Depending on the state of the NVM cell 110, it may charge the readout terminal 230 or respective charge node, or not so.

Since generally readout of the non-volatile storage device 110, that is of the NVM cell 110, only has to be performed in the normal operating state, energy or voltage buffering using energy storage device is not necessary.

If the readout process is finished, the first and second readout switches 200, 210 will be set back to their original states so that consequently the first readout switch 200 is opened and the second readout switch 210 is closed. The charge accumulated on the readout capacitor 220 is discharged via the reference potential so that the reference potential will be available at the readout terminal 230, independent of the state of the NVM cell 110.

In order to be able to erase the NVM cell 110 again, if necessary, that is set same back to its original state, it is necessary to provide a circuit by means of which the NVM cell 110 can be erased. FIG. 4 shows a schematic partial circuit diagram of an embodiment of a corresponding circuit for erasing the NVM cell 110. The NVM cell 110 is coupled with its drain terminal 110d to a first erase switch 240.

In addition, the NVM cell 110 coupled with its substrate terminal or bulk terminal 110b to a first erase voltage $U_{e1}$ which may, for example, have a voltage of 4 V, with its source terminal 110s to a second erase voltage $U_{e2}$ which may, for example, also have a voltage of 4 V, and with its gate terminal 110g via a second erase switch 250 to a third erase voltage $U_{e3}$ which, for example, have a voltage of −11 V. In addition, like in the case of the readout operation, generally no energy or voltage buffering is required here since the erase operation generally only has to be performed during normal operating conditions.

In order to erase the NVM cell 110, that is restore its original state, the first erase switch 240 is opened, as is indicated in FIG. 4 by the arrows, which is how the drain terminal 110d of the NVM cell 110 is separated from the further circuit not shown in FIG. 4. Furthermore, as is also indicated by the arrow in FIG. 4, the second erase switch 250 is closed so that the second erase voltage is applied to the gate terminal 110g of the NVM cell 110. This, in the present embodiment, results in erasing the NVM cell 110 by the process referred to as Fowler-Nordheim tunneling.

Depending on the circumstances, the method for non-volatile storage of a status value may be implemented in either hardware or software. The implementation may be on a digital storage medium, in particular on a disc, CD or DVD having control signals which may be read out electronically which can cooperate with a programmable computer system such that the method for non-volatile storage of a status value will be executed. In general, the invention thus also is in a software program product or computer program product or program product having a program code stored on a machine-readable carrier for performing the method when the software program product runs on a computer or processor. Put differently, the invention may thus also be realized as a computer program or software program or program having a program code for performing the method when the program runs on a processor. The processor here may be formed by a computer, a chip card (smart card) or another integrated circuit.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, equivalents as fall within the true spirit and scope of the present invention.

What is claimed is:

1. A device for non-volatile storage of a status value indicating that there has been a condition, comprising:
    a non-volatile storage;
    an energy storage for storing energy when applying a supply voltage; and
    a switching circuit to couple the energy storage to the non-volatile storage to write the status value thereto if the condition occurs.

2. The device according to claim 1, wherein the condition will be present if the supply voltage drops below a predetermined value.

3. The device according to claim 1, wherein the condition will be present if the supply voltage drops below a predetermined value and there is no signal indicating expected switch-off.

4. The device according to claim 1, wherein the switching circuit comprises a control terminal to which a voltage derived from the supply voltage is applied.

5. The device according to claim 1, further comprising a generator for generating a control signal for the switching circuit if the condition is present, the control signal controlling the switching circuit to couple the non-volatile storage to the energy storage.

6. The device according to claim 1, wherein the energy storage comprises a capacitor connected between a terminal of the switching circuit and a reference potential, and a diode connected between a voltage terminal of the energy storage for charging the capacitor and the capacitor.

7. The device according to claim 1, wherein the switching circuit includes a transistor.

8. The device according to claim 1, wherein the switching circuit includes an enhancement-type PMOS transistor.

9. The device according to claim 1, wherein the energy storage is subdivided into a first energy storage and a second energy storage.

10. The device according to claim 1, wherein the non-volatile storage includes an EEPROM cell which is programmable by means of hot charge carriers or the Fowler-Nordheim tunneling effect, or includes a fast non-volatile memory cell which is programmable by low an energy.

11. The device according to claim 1, wherein the device is coupled to a delayer, the delayer to delay restart of a processor to which the device is coupled.

12. The device according to claim 1, wherein the device is coupled to a counter and a counter controller, the counter controller to increment or decrement the counter depending on the status value.

13. The device according to claim 12, wherein the counter controller is to block a processor including the device, the counter and the counter controller if a count of the counter fulfills a predetermined condition.

14. A method for non-volatile storage of a status value indicating that there has been a condition, comprising:
   storing energy in an energy storage when a supply voltage is applied; and
   coupling the energy storage to a non-volatile storage for writing the status value to the non-volatile storage if the condition arises.

15. The method according to claim 14, wherein the condition will be present if a supply voltage drops below a predetermined value.

16. The method according to claim 14, wherein the condition will be present if a supply voltage drops below a predetermined value and there is no signal indicating expected switch-off.

17. The method according to claim 14, wherein the non-volatile storage includes an EEPROM cell which is programmable by means of hot charge carriers or the Fowler-Nordheim tunneling effect, or includes a fast non-volatile memory cell which is programmable with low an energy.

18. A digital storage medium comprising a program with a program code for performing a method for non-volatile storage of a status value indicating that there has been a condition, the method comprising:
   storing energy in an energy storage when a supply voltage is applied; and
   coupling the energy storage to a non-volatile storage for writing the status value to the non-volatile storage if the condition arises, when the program runs on a processor.

19. A device for non-volatile storage of a status value indicating that there has been a condition, comprising:
   a non-volatile storage;
   an energy storage means for storing energy when applying a supply voltage; and
   a switching means for coupling the energy storage means to the non-volatile storage to write the status value thereto if the condition occurs.

* * * * *